Figure 1:
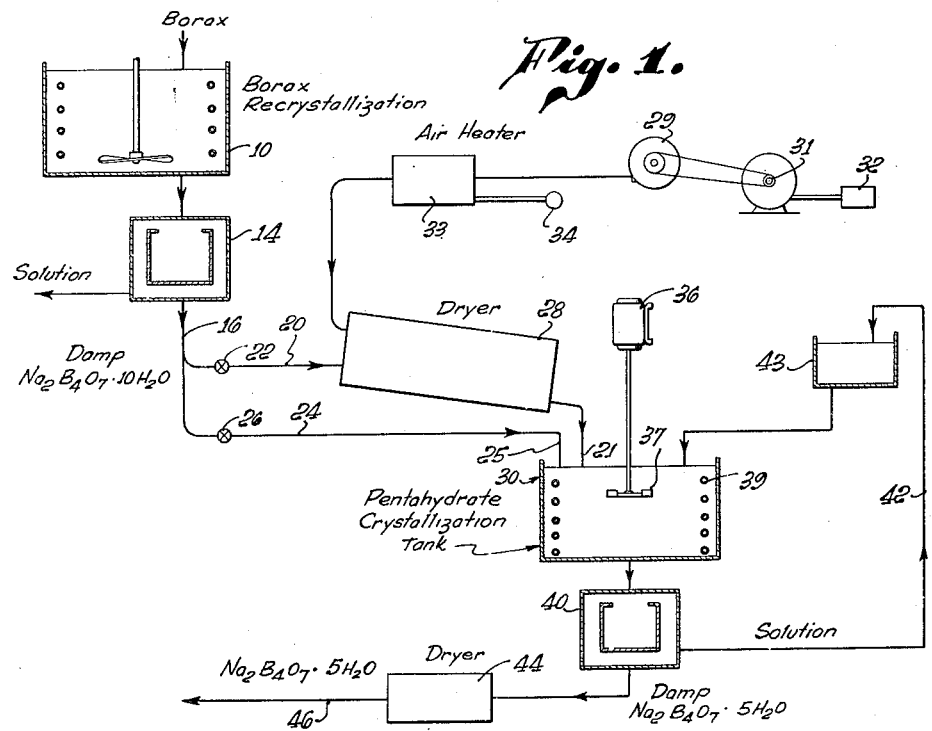

Oct. 30, 1956  J. T. YOUNG  2,768,883

PRODUCTION OF SODIUM TETRABORATE PENTAHYDRATE CRYSTALS

Filed Jan. 14, 1953

INVENTOR.
JOHN T. YOUNG,
BY
Barkelow & Seawtlebury
ATTORNEYS.

United States Patent Office 2,768,883
Patented Oct. 30, 1956

2,768,883

PRODUCTION OF SODIUM TETRABORATE PENTAHYDRATE CRYSTALS

John T. Young, Long Beach, Calif., assignor, by mesne assignments, to United States Borax & Chemical Corporation, a corporation of Nevada Application January 14, 1953, Serial No. 331,219

4 Claims. (Cl. 23—302)

This invention is concerned with the crystallization of sodium tetraborate pentahydrate, and has to do more particularly with methods by which the size distribution of the resulting pentahydrate crystals may be variably controlled.

As is well known, the solubility curves of borax (sodium tetraborate decahydrate, $Na_2B_4O_7 \cdot 10H_2O$) and of the pentahydrate ($Na_2B_4O_7 \cdot 5H_2O$) have different slopes, and cross at a definite transition temperature, approximately 143° F. Below that transition temperature the solubility of borax is less than that of the pentahydrate, and the solid phase in equilibrium with a saturated solution of sodium tetraborate is therefore borax. Above the transition temperature the equilibrium solid phase is the pentahydrate, and borax, having a higher solubility, will dissolve directly even in a solution that is supersaturated with respect to the pentahydrate. It is therefore possible, at temperatures appreciably above 143° F., to crystallize the pentahydrate from supersaturated solution at constant temperature and to maintain the concentration of tetraborate in solution by direct dissolution of borax. Additional crystallization of pentahydrate from such a solution may be obtained by cooling it substantially to the transition temperature.

The size distribution of the crystals of sodium tetraborate pentahydrate produced by any such process depends in general upon the particular conditions of operation. Such controlling factors may include, for example, the solution temperature, the degree of supersaturation that is maintained, and the relative rate at which the grown crystals are harvested from the solution. While the control of such conditions of operation permits a certain degree of control over the size of the crystals produced, it is usually preferably in actual operation of a commercial plant, and may be essential for economical operation, to maintain such conditions substantially uniform. It is an object of the present invention to provide a method by which the size distribution of the pentahydrate crystals may be variably controlled without requiring departure from optimum operating conditions of the plant.

Such control of the size distribution of a crystalline product is useful in adapting the product to different uses. In the present instance, sodium tetraborate pentahydrate is frequently used in the manufacture of glass, for example, and may then be mixed with relatively finely divided solids. A more uniform mixture may be obtainable if the screen size of the tetraborate is suitably related to that of the other solids. When such special considerations do not control, a relatively coarse screen size may offer economy of handling and reduction of dust. It is particularly desirable to be able to vary the size distribution of the product independently of the physical conditions of operation of the crystallizing step.

It has been discovered that, in a process of the general type described, the size distribution of the resulting pentahydrate crystals may be variably controlled by suitable prior treatment of the borax that is employed to make up and maintain the sodium tetraborate solution. In ordinary practice that borax is at least partially refined, as by recrystallization, to remove the major impurities present in crude borax ore. Such recrystallization is carried out below the described transition temperature to produce the decahydrate. Any suitable procedure may be employed. It is preferable that the resulting borax crystals be of sufficiently fine screen size to dissolve readily in the hot concentrated solution for production of pentahydrate.

It has been discovered that the crystal size distribution of the pentahydrate produced can be controlled by suitable determination of the total water content of the borax employed for feed. For example, it has been discovered that relatively coarse crystals of pentahydrate may be produced, other conditions of the operation remaining constant, by taking the recrystallized borax directly from its mother liquor in damp condition and adding it in that damp condition to the hot solution from which pentahydrate is crystallized. Somewhat finer crystals of pentahydrate may be produced by utilizing as feed borax crystals that have been partially or wholly surface dried. And still finer crystals of pentahydrate may be produced by subjecting the feed borax, after separation from its mother liquor, to a controlled degree of over-drying. That over-drying may be very slight, or may, as requirements of the product dictate, remove a major portion of the contained water. The over-drying is preferably so controlled as to remove some definite fraction of the initial water of crystallization of the borax. For example, 40 percent of that water may be removed, leading to a substance of the empirical formula $$Na_2B_4O_7 \cdot 6H_2O$$

Under any particular set of operating conditions, a definite size distribution of pentahydrate crystals is obtained by utilizing feed borax that has been dried to a definite corresponding total water content.

The possibility of such control of the size distribution of pentahydrate crystals could scarcely have been anticipated. For the borax, upon addition to the hot solution, presumably dissolves rapidly and completely, and might be expected to lose all trace of characteristics, such as water content, that it had when in the solid state. Once dissolved, the borax might be expected to be incapable of influencing by its previous nature the manner of formation of the pentahydrate crystals.

Nevertheless, in accordance with the present invention, control of the total water content (including both the surface water and the water of crystallization) of the feed borax has been found to provide a convenient, effective and economical means of variably determining the size distribution of the individual crystals of the pentahydrate product.

A full understanding of the invention, and of its further objects and advantages, will be had from the following description of certain typical operations that illustrate how it may be carried out. The particularities of that description and of the accompanying drawings, which form a part of it, are intended only as illustration of the invention and not as a limitation of its scope, which is defined by the appended claims.

Figure 2:
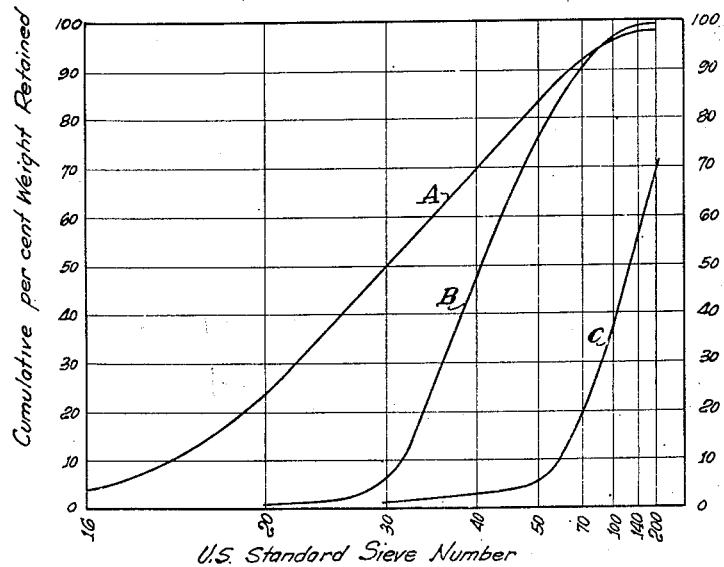

In the drawings:

Fig. 1 is a schematic representation of a typical system for producing sodium tetraborate pentahydrate in accordance with the invention; and Fig. 2 is a graph representing typical illustrative size distributions of pentahydrate crystals produced in accordance with the invention.

For the sake of clarity, Fig. 1 omits explicit showing of certain conventional details of the system, such, for example, as means for producing and controlling the flow of material.

Referring to the schematic representation of Fig. 1, borax from a convenient source is recrystallized in conventional manner in the tank 10 to produce granular crystal borax of the desired fineness and purity. The resulting borax crystals are separated from the body of the mother liquor by any suitable means, represented illustratively as the centrifuge 14. The borax crystals recovered from the centrifuge at 16 are still wet with a film of solution. That solution may be the mother liquor itself, or may comprise rinse water added during centrifuging. The relative amount of surface water retained at that stage by the damp borax crystals depends upon such factors as the crystal size and the effectiveness of centrifuge 14, or equivalent means. The surface moisture typically amounts to from 3 to 4 percent of the whole.

From 16 the damp borax crystals would normally be carried directly to the pentahydrate crystallizing tank 30, as via the route indicated schematically at 24. In accordance with the invention a different route 20 is provided, which includes means for removing a quantity of water from the borax between 16 and tank 30. Direct route 24 may then be omitted. When two alternative routes are provided, as indicated in the figure, any suitable selecting means may be provided for selectively determining which of the routes 20 and 24 is utilized. Such selecting means are indicated schematically at 22 and 26, and may in practice represent, for example, the power switches of conveyer belts corresponding to routes 20 and 24, respectively. The routes may include storage means, not shown. As illustratively shown, route 24 delivers damp borax from 16 directly to tank 30, while route 20 carries the borax first through a drier, indicated schematically at 28, and then to tank 30 at 21. Drier 28 may be of conventional type. It is preferably adjustable to permit controllable variation of the degree of dehydration of the borax that passes through it. Such variation may be accomplished in various detailed manners, for example by control of such physical conditions of the drying process as the rate of passage of the borax through the dryer, the volume of air contacted with the borax and the effective temperature and humidity of that air. As illustratively shown, air may be passed through drier 28 by a blower 29, which is powered by a motor 31 provided with a speed control indicated at 32. That air may be heated by a heater indicated at 33, which is preferably provided with a control means 34 by which the temperature of air passing to drier 28 may be variably controlled. By suitable adjustment of such controls as 32 and 34, borax may be delivered from dryer 28 to tank 30 with a definitely predetermined remaining water content, which may be either greater or less than 10 mols. That is, any predetermined portion of the surface moisture of the initially damp borax may be removed, and in addition a predetermined portion of the water of crystallization of the borax may be extracted from the borax crystals, subject, of course, to practical limitations of such a drying operation.

Crystallizing tank 30 is provided with suitable heating means, indicated illustratively as the steam coil 39. Stirring means are indicated at 37 with driving motor 36, and are preferably adapted for maintaining circulation of a type involving predominantly horiozntal movement of the fluid. The temperature of tank 30 is maintained appreciably above the transition temperature defined above, for example between 150° and 180° F. Crystals of sodium tetraborate pentahydrate produced in tank 30 may be harvested in any convenient manner, as by passing the mother liquor and suspended crystals through a centrifuge, indicated at 40. Mother liquor may be returned from the centrifuge to the crystallizing tank, as at 42, either directly or via a liquor storage tank 43. Damp crystals of pentahydrate from the centrifuge may be surface dried in the dryer 44, and may be screened and otherwise treated in any desired manner, by means not explicitly represented, before delivery as a finished product at 46.

In typical operation of a system of the type represented in Fig. 1, the damp borax crystals delivered at 16 are of any convenient screen size, preferably minus 12 mesh. The solution in crystallizing tank 30 is initially made up by first adding 25,000 lbs. of filtered liquor containing approximately 30 percent $Na_2B_4O_7 \cdot 10H_2O$. After that liquor has been heated to about 180° F., approximately 10 tons of borax crystals from 16 are added, heat being supplied to maintain the temperature above 143° during borax solution. It is preferred to return the temperature to 180° after making up the charge. To promote crystallization of pentahydrate, tank 30 may then be cooled to a temperature within the range between the described transition temperature and about 160° F. Crystals of pentahydrate are then harvested by passing liquor from tank 30 through centrifuge 40 as already described.

The operation may be carried out on a batch basis, the entire contents of tank 30, made up typically as just described, being harvested substantially immediately. Alternatively, the system may be operated on a continuous basis for an indefinite period of time. The mother liquor removed from tank 30 via centrifuge 40 is then replaced either by fresh borax solution or by mother liquor returned via line 42. The sodium tetraborate removed from tank 30 as crystalline pentahydrate is replaced by dissolving additional borax from 16. Sufficient heat is provided during solution of that borax to maintain the temperature of tank 30 appreciably above the transition temperature of 143°. In such operation on a continuous basis the crystals continue to increase somewhat in average screen size during the first few hours of operation and harvesting, then reaching a substantially constant condition. For that reason, screen analyses based on an entire run show a somewhat wider range of size distribution than is obtained from the output at a particular time during the run.

Fig. 2 represents in graphical form screen analyses made on the sodium tetraborate pentahydrate produced under the described illustrative operating conditions from feed borax of three distinct illustrative types. The curves represent plots of the cumulative percent of the entire product that was retained by screens of the indicated U. S. Standard sieve numbers. The screen sizes are plotted on a logarithmic scale as abscissae and the corresponding percents of the product are plotted as ordinates.

The crystal size distribution represented by curve A was obtained with feed borax taken directly to tank 30 from centrifuge 14, as indicated by route 24 in Fig. 1. That feed borax contained from 3 to 4 percent surface moisture in addition to its normal 10 mols of water of crystallization. Curve A represents composite results of numerous complete runs over an extended period of time.

Curve B represents the size distribution of pentahydrate crystals produced by the same procedure, but employing feed borax that had been differently treated. That feed borax had been taken from centrifuge 14 and subjected to a drying operation before delivery to tank 30, as indicated by route 20. That drying operation was so controlled as to remove the surface moisture from the crystals and to remove also approximately 1 percent of the water of crystallization. The formula representing the resulting borax would therefore be $Na_2B_4O_7 \cdot 9.9H_2O$. Curve B represents composite results obtained during an entire run of several hours with feed borax of the described type. It is immediately evident from the figure that the difference in pretreatment of the feed borax employed in producing curves A and B has resulted in an appreciable change in the size distribution of the pentahydrate produced. Curve C is representative of the further degree of control that is provided by utilization of feed borax that has been overdried to any required extent. Specifically, the pentahydrate crystals represented by curve C were produced from borax that had been subjected to dehydration in a drier 28 at an entering air temperature of about 160° F. to remove all of the surface moisture and about 8.5 percent of its normal water of crystallization, leading to an empirical formula, $Na_2B_4O_7 \cdot 9.15H_2O$. The resulting crystals of pentahydrate are seen to be very considerably finer than those produced from damp borax or from only slightly over-dried borax.

Only a negligible proportion of the product corresponding to curve C is coarser than 50 mesh. More than half of that product is finer than 120 mesh, and almost one third of it is finer than 200 mesh. On the other hand, a majority (about three quarters) of the product made from damp borax lies in the size range from 18 to 50 mesh. The range from 35 to 70 mesh includes more than four-fifths of the product made from slightly over-dried borax.

Size distributions other than those specifically represented can be produced by utilizing feed borax from which other definite amounts of moisture either greater or less than those specifically illustrated have been removed. For example, a size distribution intermediate those represented by curves B and C can be produced in the particular illustrative system described by utilizing feed borax that has been over-dried to a water content intermediate 9.9 and 9.15 mols of water. The described type of control of crystal size, made available by the invention, provides a means of control that is additional to the normally available control factors, such as solution temperature and rate of harvesting. For any given set of conditions of those known factors, distinct crystal size distributions are obtainable from borax of different degrees of dehydration, and any one of those size distributions can be produced by selective pre-treatment of the borax feed to produce the corresponding predetermined water content.

I claim:

1. The method of producing sodium tetraborate pentahydrate crystals having a desired size distribution from a beginning stock of sodium tetraborate decahydrate crystals; said method comprising evaporating from the crystals of said beginning stock a predetermined amount of water which is greater the finer the size distribution of the desired product, then dissolving the resulting sodium tetraborate decahydrate at a temperature appreciably above 143° F. in an aqueous solution that is supersaturated with respect to sodium tetraborate pentahydrate, and crystallizing sodium tetraborate pentahydrate from that solution.

2. The method of controlling the size distribution of sodium tetraborate pentahydrate crystals, that comprises crystallizing from aqueous solution sodium tetraborate decahydrate crystals, separating from the body of the solution the decahydrate crystals in damp condition, removing from the resulting damp crystals a selected portion of the total water that is present as superficially adhering water and as water of crystallization to produce sodium tetraborate of adjusted total water content different from 10 mols of water per mol of sodium tetraborate, said adjusted water content being smaller the finer the size distribution of the desired product, then dissolving the resulting sodium tetraborate decahydrate at a temperature appreciably about 143° F. in an aqueous solution that is supersaturated with respect to sodium tetraborate pentahydrate, and crystallizing sodium tetraborate pentahydrate from that solution.

3. The method of controlling the size distribution of sodium tetraborate pentahydrate crystals, that comprises crystallizing from aqueous solution sodium tetraborate decahydrate crystals, separating from the body of the solution the decahydrate crystals in damp condition, evaporating from the resulting damp crystals a portion only of the superficially adhering water, said evaporated water portion being smaller the coarser the size distribution of the desired product, then dissolving the resulting partially surface dried sodium tetraborate decahydrate at a temperature appreciably above 143° F. in an aqueous solution that is supersaturated with respect to sodium tetraborate pentahydrate, and crystallizing sodium tetraborate pentahydrate from that solution.

4. The method of controlling the size distribution of sodium tetraborate pentahydrate crystals, that comprises crystallizing from aqueous solution sodium tetraborate decahydrate crystals, separating from the body of the solution the decahydrate crystals in damp condition, evaporating from the resulting damp crystals the superficially adhering water and a portion of the water of crystallization, said evaporated portion of the water of crystallization being greater the finer the size distribution of the desired product, then dissolving the resulting sodium tetraborate decahydrate at a temperature appreciably above 143° F. in an aqueous solution that is supersaturated with respect to sodium tetraborate pentahydrate, and crystallizing sodium tetraborate pentahydrate from that solution.

References Cited in the file of this patent

UNITED STATES PATENTS 2,130,065    Burke et al. _____ Sept. 13, 1938

FOREIGN PATENTS 423,785    Great Britain _____ Feb. 7, 1935

OTHER REFERENCES

Mellor: "Comprehensive Treatise on Inorganic and Theoretical Chemistry," published by Longmans, Green and Co., New York, 1924, volume 5, page 70.